March 8, 1949. O. L. ENGSTROM 2,464,030
LIQUID MEASURING DISPENSER
Filed May 31, 1946
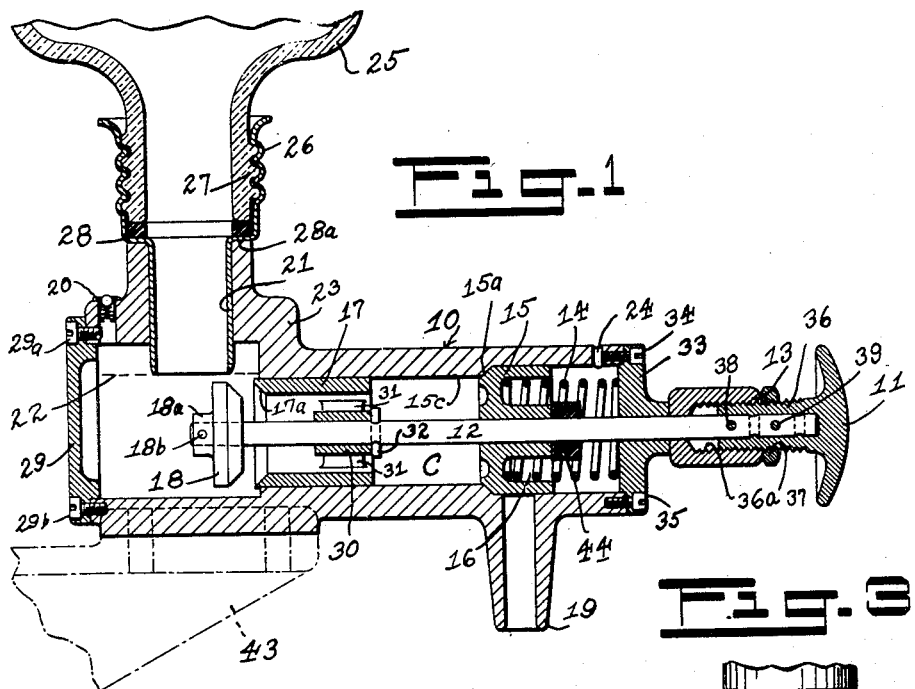
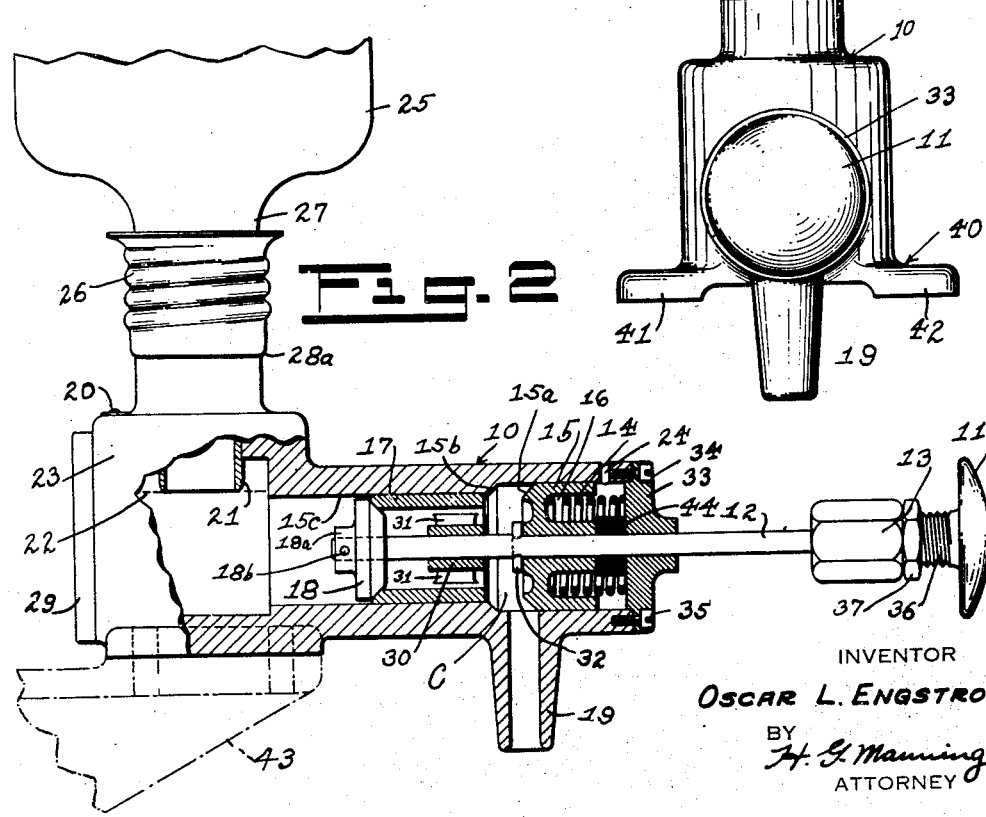
INVENTOR
OSCAR L. ENGSTROM
BY
H. G. Manning
ATTORNEY Patented Mar. 8, 1949

2,464,030

UNITED STATES PATENT OFFICE 2,464,030

LIQUID MEASURING DISPENSER

Oscar L. Engstrom, New York, N. Y.

Application May 31, 1946, Serial No. 673,347

7 Claims. (Cl. 222—287)

This invention relates to dispensing apparatus, and more particularly to a liquid measuring pump designed for use at soda fountains, etc.

One object of the present invention is to provide a dispensing pump of the above nature capable of rapidly delivering measured quantities of liquid, repeatedly.

A further object is to provide a device of the above nature having spring means for assisting in automatically restoring it to its original condition after each dispensing operation.

A further object is to provide a device of the above nature having means for the attachment of an inverted bottle containing a supply of syrup or other liquid.

A further object is to provide a device of the above nature which will be simple in construction, inexpensive to manufacture, easy to install, adjust, and manipulate, compact, ornamental in appearance, and very efficient and durable in use.

With these and other objects in view, there has been illustrated on the accompanying drawings one form in which the invention may conveniently be embodied in practice.

In the drawings,

Fig. 1 is a longitudinal sectional view of the dispensing apparatus when arranged to receive liquid from a bottle supported above it—the inlet valve being shown in open condition, and the outlet valve being shown closed.

Fig. 2 is a similar sectional view of the same, showing the outlet valve arranged in open discharge position and with the inlet valve closed.

Fig. 3 is an end view of the same, taken from the right hand of Fig. 1.

The present invention is designed for measuring and dispensing accurate quantities of liquid by means of a manually-operated reciprocating pump piston.

Referring now to the drawing in which like reference numerals denote corresponding parts throughout the several views, the numeral 10 indicates a hollow cylindrical body of the measuring dispenser having an interior measuring chamber C. The dispenser is adapted to be operated by means of a handle knob 11 secured to the end of a horizontal elongated piston rod 12 having a hollow adjusting nut 13 screwed thereon outside the measuring chamber adjacent the knob 11.

Provision is also made of a helical spring 14 surrounding the rod 12 and engaging a hollow outlet valve 15 which has a beveled end 15a for engagement with a shoulder 15b on a reduced cylindrical interior section 15c of the body 10. The valve 15 serves to close the outlet to a spout 19 whenever the handle knob 11 is pushed inwardly—the spring 14, which seats in an annular recess 16 of said valve 15, acting to cushion the action thereof and assisting in restoring said valve to closed position.

Provision is also made of a hollow center cylindrical pump piston 17 having a countersunk seat 17a shaped to fit a beveled disk inlet valve 18 located adjacent thereto. The valve 18 has a reduced neck 18a secured rigidly to the end of the shaft 12 by means of a short pin 18b.

In order to permit the escape of air from the interior of the measuring chamber C, provision is made of a ball check valve 20 located in the raised upper portion of the rear end 23 of said chamber. The raised upper portion 23 communicates with a depending inlet pipe 21 which determines the level 22 of the liquid which has entered the chamber C.

In order to permit the escape of air at the forward end of the measuring chamber C, provision is made of an open air vent 24 in the upper portion adjacent the end thereof.

In order to receive an inverted bottle 25 of syrup or other liquid to be dispensed, the inlet pipe 21 has an enlarged threaded integral bushing 26 for engaging a threaded neck 27 of said bottle—a gasket ring 28 being located between the end of the bottle 25 and a shoulder 28a in the inlet pipe 21.

At the rear end of the measuring chamber C, provision is made of a removable end head 29, which is detachably secured to the body 10 by means of screws 29a, 29b.

The pump piston 17 is provided with a central bearing bracket 30 loosely slidable over the rod 12 and secured rigidly to said piston 17 by means of a plurality of radial attaching spokes 31 rigidly secured to the interior of said piston 17.

A cross pin 32 is rigidly secured to the rod 12 between the outlet valve 15 and the pump piston 17 for a purpose to be hereinafter described.

At the forward end of the measuring chamber C, provision is made of a bearing head 33 fitted about the shaft 12—said head being secured to the body 10 by means of screws 34, 35.

In order to adjust the quantity of liquid dispensed from the apparatus at each operation of the pump piston 17, the handle knob 11 is provided with a threaded neck 36 adapted to be screwed within a tapped interior section 36a of the adjustable nut 13, said neck 36 being secured in position by means of a lock nut 37, and a pair of cross pins 38, 39, passing through the rod 12 as clearly shown in Fig. 1.

The dispensing body 10 may be mounted upon a pedestal 40 having a pair of outwardly-extending legs 41, 42 secured upon a shelf 43 or other support during use.

If desired, a soft rubber packing plug 44 may be located on the rod 12 between the outlet valve 15 and the head 33 to further cushion the action of the device.

Operation

In operation, when it is desired to dispense an accurately measured quantity of liquid from the bottle 25, through the spout 19 into a suitable receptacle, not shown, the operator will first pull the handle knob 11 to the right from the position shown in Fig. 1, as far as it will go to the position shown in Fig. 2. This action will cause the inlet valve 18 to close the pump piston 17, and then move said piston to the right. The pin 32 will then engage the outlet valve 15 causing it likewise to move to the right against the action of the spring 14—thus opening the outlet into the discharge spout 19.

The liquid will then be discharged from the chamber C through the spout 19 into the receptacle located under said spout.

To restore the parts to the original position shown in Fig. 1, the handle 11 may then be pushed to the left, causing the outlet valve 15 to close and the pin 32 to move the pump piston 17 to the left, this action being assisted by the force of the spring 14 which presses against the outlet valve 15.

Any air which may be trapped in the lower part of the left hand chamber 23 will pass up into the bottle 25, and the excess air pressure above the liquid level 22 being relieved through the ball valve 20. This construction avoids any possibility of injury to the apparatus during use.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within scope of the following claims.

Having thus fully described the invention, what is claimed as new, and for which it is desired to secure Letters Patent, is:

1. In a measuring liquid dispenser, a horizontal cylindrical body chamber having an annular outlet valve seat near one end thereof, means at the other end of said chamber for connection with an inverted liquid supply bottle, a discharge spout below said outlet valve, a horizontal handle-operated rod located within said chamber, an outlet valve loosely mounted on the forward end of said rod adjacent said discharge spout, a spring for pressing said outlet valve rearwardly against said valve seat in order to initially close said spout, a pump piston slidably mounted near the other end of said rod, an inlet valve rigidly connected to the rear end of said rod for closing said pump piston when said shaft is pulled to the right, and an intermediate pin on said rod between said pump piston and said outlet valve to engage said piston and said valve alternately when said handle is reciprocated.

2. A device as defined in claim 1, in which said chamber is provided with an enlarged rear section having a depending inlet tube in the upper portion thereof to maintain the liquid level in said chamber above the position of said pump piston.

3. The invention as defined in claim 1, in which an air vent opening is provided in the upper portion of said chamber at the discharge end thereof.

4. The invention as defined in claim 1, in which said slidable pump piston is provided with a central rod bearing bushing secured to the outer portion thereof by means of spokes.

5. The invention as defined in claim 1, in which a nut is located on the forward end of said rod outside of said chamber for adjustable connection with said operating handle.

6. The invention as defined in claim 1, in which an adjustable nut is located on said rod outside said chamber, and a lock nut is provided for securing said adjustable nut in adjusted position upon said handle.

7. The invention as defined in claim 1, in which an adjustable nut is located on said rod outside said chamber, and the end of said rod has a handle provided with a reduced threaded neck for engagement within said nut.

OSCAR L. ENGSTROM.

REFERENCES CITED

The following references are of record in the file of this patent:

UNITED STATES PATENTS

| Number | Name | Date |
| --- | --- | --- |
| 1,110,135 | Henderson | Sept. 8, 1914 |
| 1,268,820 | Depew | June 11, 1918 |
| 1,648,593 | Schatz | Nov. 8, 1927 |
| 1,963,783 | Fox | June 19, 1934 |